(12) United States Patent
Komatsu et al.

(10) Patent No.: US 11,027,709 B2
(45) Date of Patent: Jun. 8, 2021

(54) BICYCLE OPERATING DEVICE

(71) Applicant: SHIMANO INC., Sakai (JP)

(72) Inventors: Atsushi Komatsu, Sakai (JP);
Takafumi Nishino, Sakai (JP);
Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/135,498

(22) Filed: Apr. 21, 2016

(65) Prior Publication Data

US 2017/0305395 A1    Oct. 26, 2017

(51) Int. Cl.
*B60T 7/08* (2006.01)
*B60T 7/10* (2006.01)
*B62K 23/06* (2006.01)
*B62L 3/02* (2006.01)

(52) U.S. Cl.
CPC .............. *B60T 7/085* (2013.01); *B60T 7/102* (2013.01); *B62K 23/06* (2013.01); *B62L 3/02* (2013.01)

(58) Field of Classification Search
CPC .......... B62L 3/02; B60T 11/046; B60T 7/102; B62K 23/06; B62K 23/02; B62K 21/12
USPC ...................................................... 188/24.22
See application file for complete search history.

(56) References Cited

U.S. PATENT DOCUMENTS

| | | | |
|---|---|---|---|
| 5,470,277 A * | 11/1995 | Romano | B62M 9/122 474/110 |
| 6,619,154 B2 | 9/2003 | Campagnolo | |
| 6,698,567 B2 | 3/2004 | Dal | |
| 6,991,081 B2 | 1/2006 | Uno et al. | |
| 7,760,078 B2 * | 7/2010 | Miki | B62K 23/02 340/432 |
| 7,874,229 B2 | 1/2011 | Tetsuka | |
| 7,908,940 B2 | 3/2011 | Naka et al. | |
| 8,286,529 B2 | 10/2012 | Tetsuka | |
| 8,539,856 B2 | 9/2013 | Watarai | |
| 8,549,955 B2 * | 10/2013 | Sato | B62K 23/06 74/488 |

(Continued)

FOREIGN PATENT DOCUMENTS

| | | |
|---|---|---|
| CN | 1327930 | 12/2001 |
| CN | 101445143 | 6/2009 |

(Continued)

OTHER PUBLICATIONS

Office Action with Form PTO-892 Notice of References Cited issued by the Unites States Patent and Trademark Office for the co-pending U.S. Appl. No. 15/135,488, dated Apr. 17, 2018.

(Continued)

*Primary Examiner* — Bradley T King
*Assistant Examiner* — Mahbubur Rashid
(74) *Attorney, Agent, or Firm* — Mori & Ward, LLP

(57) ABSTRACT

A bicycle operating device comprises a base member, a brake operating member, an electrical switch, and a wireless communication unit. The brake operating member is movably coupled to the base member. The electrical switch is to provide an electric signal. The electrical switch is disposed at one of the base member and the brake operating member. The wireless communication unit is connected to the electrical switch to transmit a wireless signal based on the electric signal. The wireless communication unit is disposed at the other of the base member and the brake operating member.

17 Claims, 12 Drawing Sheets

(56) References Cited

U.S. PATENT DOCUMENTS

| | | | | |
|---|---|---|---|---|
| 8,655,561 | B2* | 2/2014 | Kitamura | B62M 25/08 |
| | | | | 701/51 |
| 8,909,424 | B2* | 12/2014 | Jordan | B62K 23/02 |
| | | | | 701/36 |
| 8,931,365 | B2 | 1/2015 | Fujii et al. | |
| 9,045,193 | B2 | 6/2015 | Dal | |
| 9,056,651 | B2 | 6/2015 | Tetsuka | |
| 9,191,038 | B2* | 11/2015 | Abe | G08C 17/00 |
| 9,211,936 | B2* | 12/2015 | Gao | B62L 3/02 |
| 9,321,505 | B2 | 4/2016 | Miki | |
| 2005/0099277 | A1* | 5/2005 | Hsu | B60Q 1/2676 |
| | | | | 340/432 |
| 2007/0193388 | A1* | 8/2007 | Nakano | B62M 25/08 |
| | | | | 74/501.6 |
| 2008/0180233 | A1* | 7/2008 | Miglioranza | A45F 5/102 |
| | | | | 340/432 |
| 2008/0210046 | A1* | 9/2008 | De Perini | B62K 23/02 |
| | | | | 74/502.2 |
| 2009/0315692 | A1 | 12/2009 | Miki et al. | |
| 2010/0199798 | A1 | 8/2010 | Uno | |
| 2011/0074568 | A1* | 3/2011 | Li | B62J 6/04 |
| | | | | 340/479 |
| 2011/0079453 | A1* | 4/2011 | Wanger | B62K 27/003 |
| | | | | 180/11 |
| 2012/0221205 | A1* | 8/2012 | Ichida | B62J 99/00 |
| | | | | 701/37 |
| 2013/0061705 | A1* | 3/2013 | Jordan | B62M 25/08 |
| | | | | 74/473.13 |
| 2013/0151073 | A1* | 6/2013 | Tetsuka | B62M 25/04 |
| | | | | 701/37 |
| 2013/0180815 | A1 | 7/2013 | Dunlap et al. | |
| 2014/0015659 | A1* | 1/2014 | Tetsuka | B62K 23/02 |
| | | | | 340/432 |
| 2014/0053675 | A1 | 2/2014 | Tetsuka | |
| 2014/0058578 | A1* | 2/2014 | Tetsuka | B62M 25/08 |
| | | | | 701/1 |
| 2014/0102237 | A1 | 4/2014 | Jordan et al. | |
| 2014/0144275 | A1 | 5/2014 | Kariyama et al. | |
| 2014/0214285 | A1 | 7/2014 | Wesling | |
| 2014/0352478 | A1* | 12/2014 | Gao | B62L 3/02 |
| | | | | 74/488 |
| 2015/0203169 | A1* | 7/2015 | Nishino | B62K 23/06 |
| | | | | 74/491 |
| 2015/0259025 | A1 | 9/2015 | Sala et al. | |
| 2015/0284049 | A1* | 10/2015 | Shipman | B62M 25/08 |
| | | | | 74/473.12 |
| 2015/0367176 | A1* | 12/2015 | Bejestan | G06F 19/3481 |
| | | | | 482/9 |
| 2017/0305488 | A1 | 10/2017 | Komatsu et al. | |
| 2017/0305489 | A1 | 10/2017 | Komatsu et al. | |
| 2017/0305491 | A1 | 10/2017 | Komatsu et al. | |
| 2018/0057102 | A1 | 3/2018 | Komatsu et al. | |
| 2018/0057103 | A1 | 3/2018 | Komatsu et al. | |
| 2018/0057104 | A1 | 3/2018 | Komatsu et al. | |
| 2018/0057105 | A1 | 3/2018 | Komatsu et al. | |

FOREIGN PATENT DOCUMENTS

| | | |
|---|---|---|
| CN | 101607581 | 12/2009 |
| CN | 103204219 | 7/2013 |
| CN | 103625593 | 3/2014 |
| CN | 103847923 | 6/2014 |
| CN | 104210612 | 12/2014 |
| CN | 104973207 | 10/2015 |
| DE | 11 2008 001 717 B4 | 7/2010 |
| DE | 202011005403 U1 | 8/2011 |
| DE | 10 2013 016 777 | 4/2014 |
| EP | 3018048 | 5/2016 |
| FR | 2809703 | 12/2001 |

OTHER PUBLICATIONS

Office Action with Form PTO-892 Notice of References Cited issued by the United States Patent and Trademark Office for the co-pending U.S. Appl. No. 15/135,469, dated Feb. 23, 2018.

Office Action with Form PTO-892 Notice of References Cited issued by the United States Patent and Trademark Office for the co-pending U.S. Appl. No. 15/135,475, dated Feb. 23, 2018.

Office Action with Form PTO-892 Notice of References Cited issued by the United States Patent and Trademark Office for the co-pending U.S. Appl. No. 15/135,486, dated Mar. 5, 2018.

Office Action with Form PTO-892 Notice of References Cited issued by the United States Patent and Trademark Office for the co-pending U.S. Appl. No. 15/135,492, dated Apr. 4, 2018.

Office Action with Form PTO-892 Notice of References Cited issued by the United States Patent and Trademark Office for the co-pending U.S. Appl. No. 15/135,481, dated Sep. 28, 2018.

Office Action issued by the United States Patent and Trademark Office for the co-pending U.S. Appl. No. 15/135,475, dated Jun. 18, 2018.

Office Action with Form PTO-892 Notice of References Cited issued by the United States Patent and Trademark Office for the co-pending U.S. Appl. No. 15/135,486, dated Jul. 30, 2018.

Office Action with Form PTO-892 Notice of References Cited issued by the United States Patent and Trademark Office for the co-pending U.S. Appl. No. 15/135,492, dated Aug. 15, 2018.

Office Action issued by the United States Patent and Trademark Office for the co-pending U.S. Appl. No. 15/135,488, dated Sep. 12, 2018.

Office Action issued by the United States Patent and Trademark Office for the co-pending U.S. Appl. No. 15/135,486, dated Nov. 13, 2018.

Office Action issued by the United States Patent and Trademark Office for the co-pending U.S. Appl. No. 15/135,492, dated Feb. 21, 2019.

Office Action issued by the United States Patent and Trademark Office for the co-pending U.S. Appl. No. 15/135,492, dated Nov. 27, 2018.

Office Action with Form PTO-892 Notice of References Cited issued by the United States Patent and Tradmark Office for the co-pending U.S. Appl. No. 15/135,475, dated Jan. 8, 2019.

Office Action issued by the United States Patent and Trademark Office for the co-pending U.S. Appl. No. 15/135,488, dated Dec. 19, 2018.

Office Action issued by the United States Patent and Trademark Office for the co-pending U.S. Appl. No. 15/135,488, dated Mar. 5, 2019.

Office Action issued by the United States Patent and Trademark Office for the co-pending U.S. Appl. No. 15/135,481, dated Apr. 8, 2019.

Define may be—Google search, google.com., Apr. 1, 2019, See Cite No. 6.

Define front side—Google search, google.com., Apr. 1, 2019, See Cite No. 6.

* cited by examiner

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, a brake operating member, an electrical switch, and a wireless communication unit. The brake operating member is movably coupled to the base member. The electrical switch is to provide an electric signal. The electrical switch is disposed at one of the base member and the brake operating member. The wireless communication unit is connected to the electrical switch to transmit a wireless signal based on the electric signal. The wireless communication unit is disposed at the other of the base member and the brake operating member.

With the bicycle operating device according to the first aspect, the electrical switch is disposed near the brake operating member where a user's hand is positioned. Accordingly, it facilitates the user's operation to turn on the electrical switch. In addition, the wireless communication unit is disposed at a different position from a position where the electrical switch is disposed. This means an electrical unit including the electrical switch is disposed at one of the brake operating member and the base member and another electrical unit including the wireless communication unit is disposed at the other of the brake operating member and the base member. Each of the two electrical units is smaller than an electrical unit having both the electrical switch and the wireless communication unit. Accordingly, it enables flexible designs of the brake operating member and the base member.

In accordance with a second aspect of the present invention, the bicycle operating device according to the first aspect further comprises a cable operating structure coupled to the brake operating member to move a mechanical control cable in response to a movement of the brake operating member relative to the base member.

With the bicycle operating device according to the second aspect, it enables the braking operation by the mechanical control cable.

In accordance with a third aspect of the present invention, the bicycle operating device according to one of the above aspects further comprises a hydraulic unit coupled to the brake operating member to generate a hydraulic pressure in response to a movement of the brake operating member relative to the base member.

With the bicycle operating device according to the third aspect, it is possible to respectively perform the braking operation and the different operation via the hydraulic fluid and the wireless communication.

In accordance with a fourth aspect of the present invention, the bicycle operating device according to one of the above aspects further comprises an informing unit disposed on at least one of the base member and the brake operating member.

With the bicycle operating device according to the fourth aspect, it is possible to inform a user of information related to the bicycle operating device.

In accordance with a fifth aspect of the present invention, the bicycle operating device according to one of the above aspects is configured so that the informing unit is connected to the wireless communication unit to inform a user of a status of the wireless communication unit.

With the bicycle operating device according to the fifth aspect, it is possible to check the status of the wireless communication unit.

In accordance with a sixth aspect of the present invention, the bicycle operating device according to one of the above aspects is configured so that the base member includes a first end portion and a second end portion. The first end portion is configured to be coupled to a handlebar in a mounting state where the bicycle operating device is mounted to the handlebar. The second end portion is opposite to the first end portion. The brake operating member is movably coupled to the second end portion.

With the bicycle operating device according to the sixth aspect, it is possible to provide a distance between the handlebar and the brake operating member. Accordingly, it is possible to prevent interference between the handlebar and the brake operating member.

In accordance with a seventh aspect of the present invention, the bicycle operating device according to one of the above aspects is configured so that the first end portion includes a mounting surface having a curved shape corresponding to face a drop-down handlebar.

With the bicycle operating device according to the seventh aspect, it is possible to firmly fix the bicycle operating device to the drop-down handlebar.

In accordance with an eighth aspect of the present invention, the bicycle operating device according to one of the above aspects is configured so that the base member includes a grip portion arranged between the first end portion and the second end portion.

With the bicycle operating device according to the eighth aspect, the grip portion allows the user to easily operate the brake operating member.

In accordance with a ninth aspect of the present invention, the bicycle operating device according to one of the above aspects is configured so that the second end portion includes a pommel portion.

With the bicycle operating device according to the ninth aspect, the pommel portion allows the user to lean on the base member during riding a bicycle.

In accordance with a tenth aspect of the present invention, the bicycle operating device according to one of the above aspects is configured so that the first end portion is configured to be coupled to a bar end of a handlebar in the mounting state.

With the bicycle operating device according to the tenth aspect, it is possible to utilize the bicycle operating device as a bar-end operating device.

In accordance with an eleventh aspect of the present invention, the bicycle operating device according to one of the above aspects further comprises a power supply electrically connected to at least one of the electrical switch and the wireless communication unit.

With the bicycle operating device according to the eleventh aspect, it is possible to supply electric power to the at least one of the electrical switch and the wireless communication unit.

In accordance with a twelfth aspect of the present invention, the bicycle operating device according to one of the above aspects is configured so that the power supply is disposed on at least one of the base member and the brake operating member.

With the bicycle operating device according to the twelfth aspect, it is possible to embed the electric energy supply unit in one electrical unit including the electrical switch or another electrical unit including the wireless communication unit. Accordingly, an electrical wiring can be simplified.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
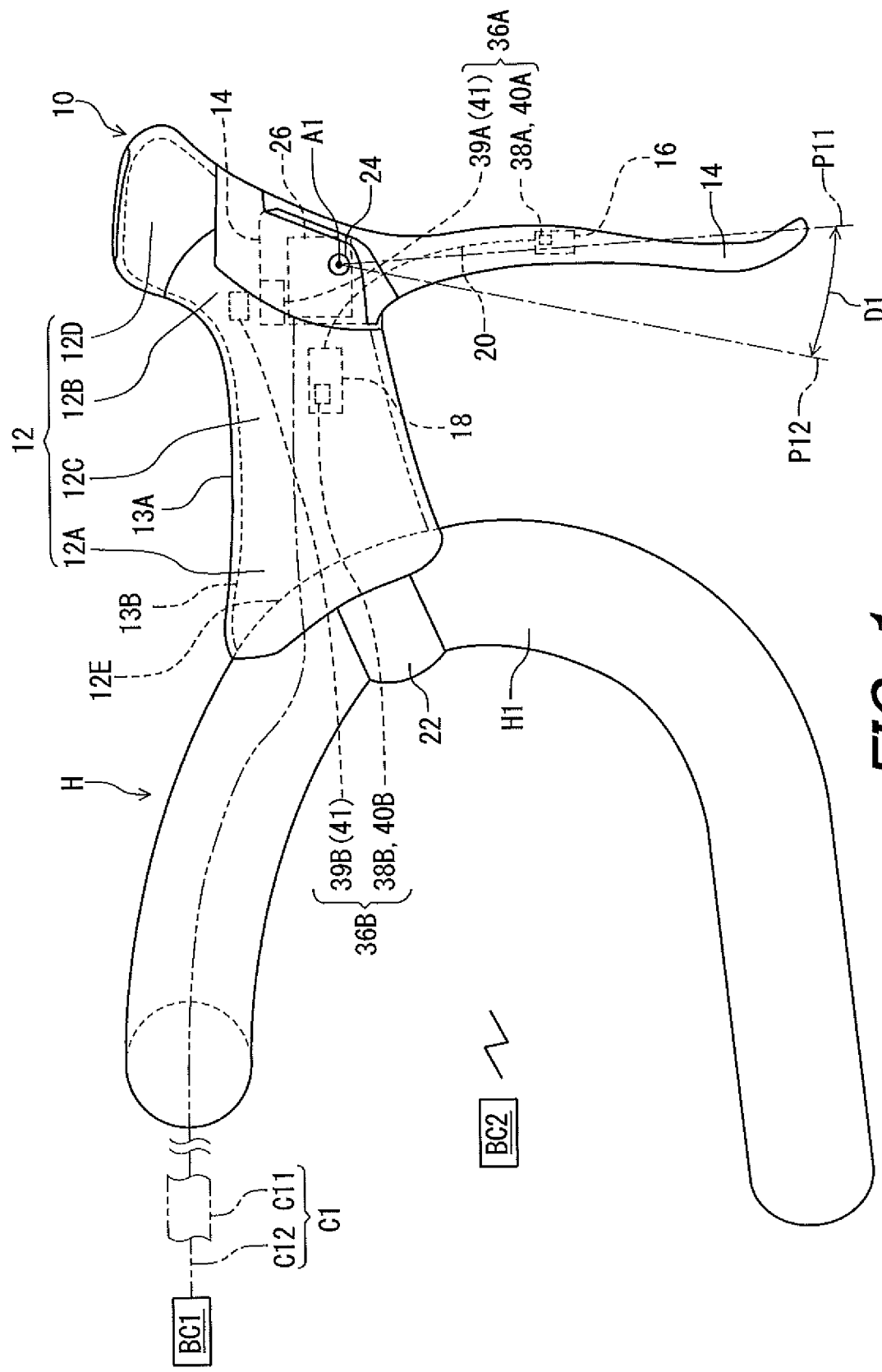
FIG. 1 is a right side elevational view of a bicycle handle provided with a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar. The handlebar H can also be referred to as the drop-down handlebar H.

The bicycle operating device 10 is operatively coupled to a bicycle brake BC1. In this embodiment, the bicycle operating device 10 is operatively coupled to the bicycle brake BC1 via a control element C1. While the control element C1 is a mechanical control cable in this embodiment, the control element C1 can be other elements such as a hydraulic hose and an electric control cable. The control element C1 can also be referred to as the mechanical control cable C1.

Furthermore, the bicycle operating device 10 is operatively connected to the electrical bicycle component BC2 via wireless communication. Examples of the electrical bicycle component BC2 include an electric shifting device, an electric suspension, and an electric seatpost. In this embodiment, the bicycle operating device 10 is operatively connected to an electric shifting device as the electrical bicycle component BC2 via wireless communication. The electrical bicycle component BC2 can also be referred to as the electric shifting device BC2. Examples of the electric shifting device BC2 include a derailleur and an internal-gear hub.

In this embodiment, the bicycle operating device 10 is a right hand side control device configured to be operated by the rider's right hand to actuate the bicycle brake BC1 and the electrical bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

Figure 2:
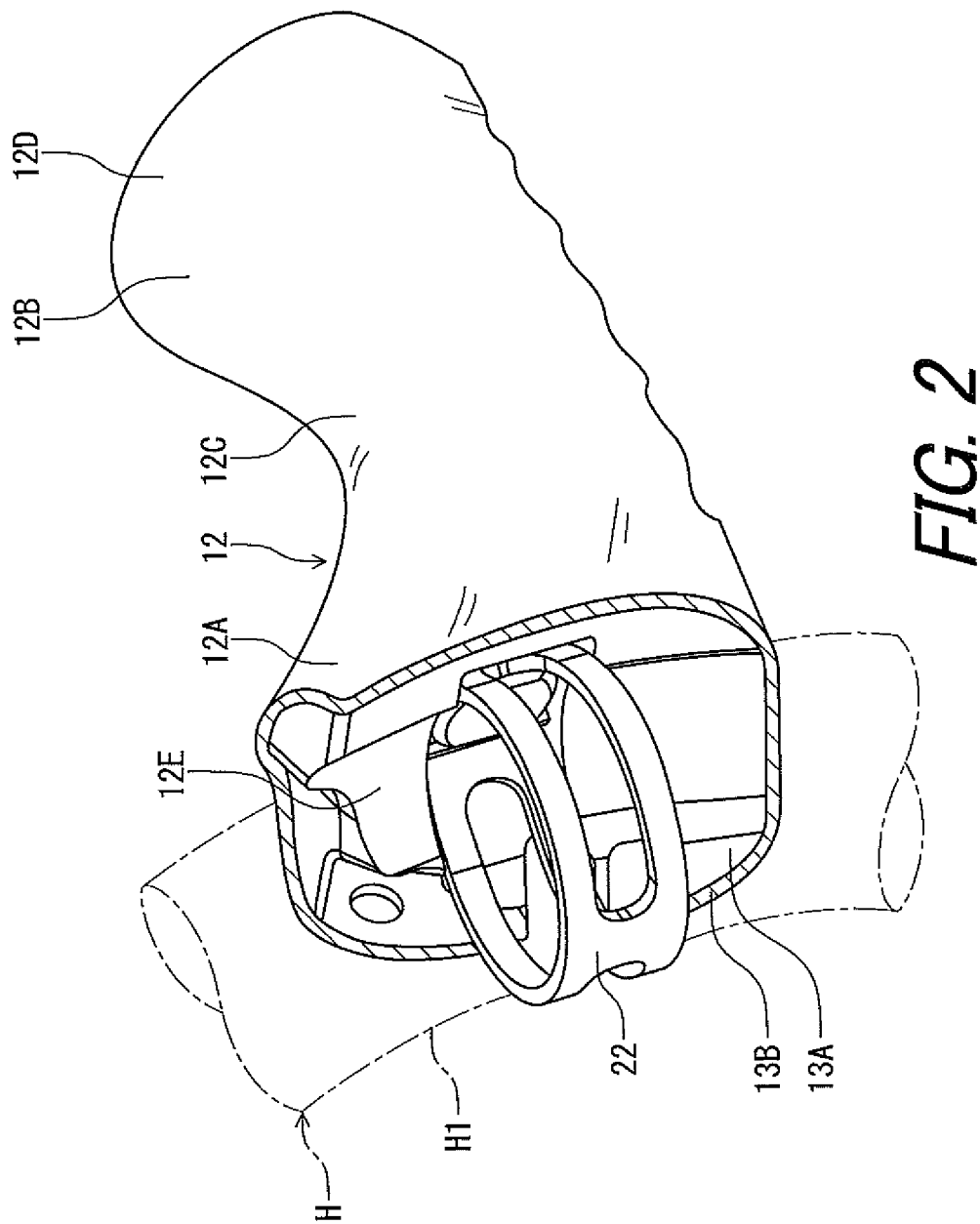
FIG. 2 is a partial perspective view of the bicycle operating device illustrated in FIG. 1.

As seen in FIG. 1, the bicycle operating device 10 comprises a base member 12, a brake operating member 14, a first electrical unit 16, and a second electrical unit 18. Each of the first electronic unit 16 and the second electrical unit 18 may include an electronic substrate and at least one electronic component (e.g. an electrical switch 30 or a wireless communication unit 32 to be described later) mounted on the electronic substrate. The first electrical unit 16 and the second electrical unit 18 are connected by an electrical cable 20. The base member 12 includes a first end portion 12A and a second end portion 12B. The first end portion 12A is configured to be coupled to the handlebar H in a mounting state where the bicycle operating device 10 is mounted to the handlebar H. The drop-down handlebar H includes a curved part H1. The first end portion 12A is configured to be coupled to the curved part H1 in the mounting state where the bicycle operating device 10 is mounted to the handlebar H. The bicycle operating device 10 comprises a mounting clamp 22 to couple the base member 12 to the handlebar H. As seen in FIG. 2, the first end portion 12A includes a mounting surface 12E having a curved shape corresponding to the drop-down handlebar H. Specifically, the mounting surface 12E has the curved shape corresponding to an outer peripheral surface of the curved part H1.

As seen in FIGS. 1 and 2, the second end portion 12B is opposite to the first end portion 12A. The base member 12 includes a grip portion 12C arranged between the first end portion 12A and the second end portion 12B. The second end portion 12B includes a pommel portion 12D. The pommel portion 12D extends obliquely upward from the grip portion 12C. The pommel portion 12D is disposed at a position higher than a position of the first end portion 12A in the mounting state of the bicycle operating device 10.

In this embodiment, the base member 12 includes a base body 13A and a grip cover 13B. The grip cover 13B at least partly covers the base body 13A. The first end portion 12A, the second end portion 12B, the grip portion 12C, and the pommel portion 12D are constituted by at least one of the base body 13A and the grip cover 13B. The grip cover 13B can be omitted from the base member 12.

As seen in FIG. 1, the brake operating member 14 is movably coupled to the base member 12. The brake operating member 14 is movably coupled to the second end portion 12B. The brake operating member 14 is pivotable relative to the base member 12 about a first pivot axis A1. Specifically, the brake operating member 14 is pivotable relative to the base member 12 about the first pivot axis A1 in the first direction D1. The brake operating member 14 is pivotable relative to the base member 12 between a first rest position P11 and a first operated position P12. In this embodiment, the first direction D1 is a circumferential direction defined about the first pivot axis A1.

In the present application, the term "rest position" as used herein refers to a position at which a movable part such as the brake operating member 14 remains stationary in a state where the movable part is not operated by the user. The term "operated position" as used herein refers to a position at which the movable part has been operated by the user to perform the operation of the bicycle component.

As seen in FIG. 1, the brake operating member 14 is pivotally coupled to the base member 12 via a first pivot pin 24. The first pivot pin 24 defines the first pivot axis A1. The brake operating member 14 is biased by a first biasing member (not shown) toward the first rest position P11 relative to the base member 12. Thus, the brake operating member 14 is at the first rest position P11 in a state where the brake operating member 14 is not operated by the user.

Figure 3:
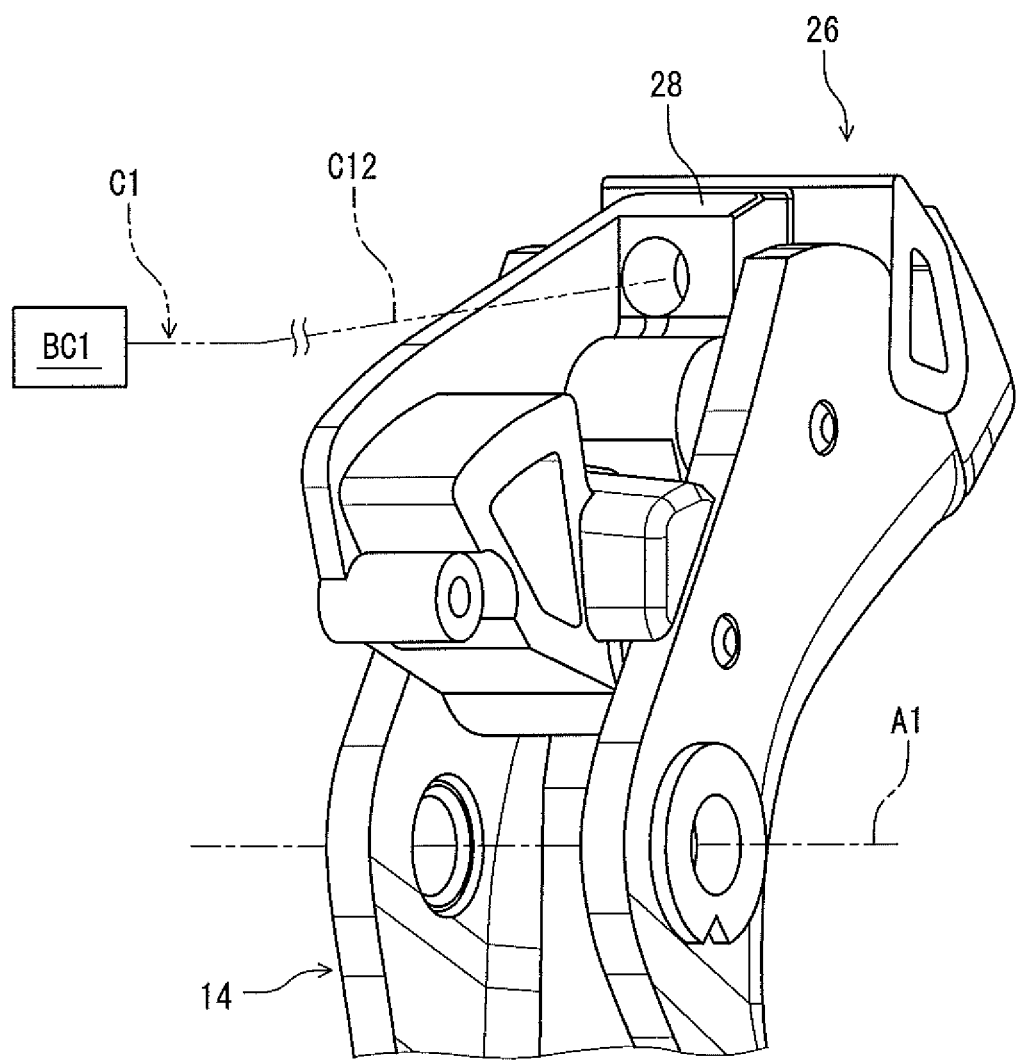
FIG. 3 is a partial right side elevational view of the bicycle operating device illustrated in FIG. 1.
Figure 6:
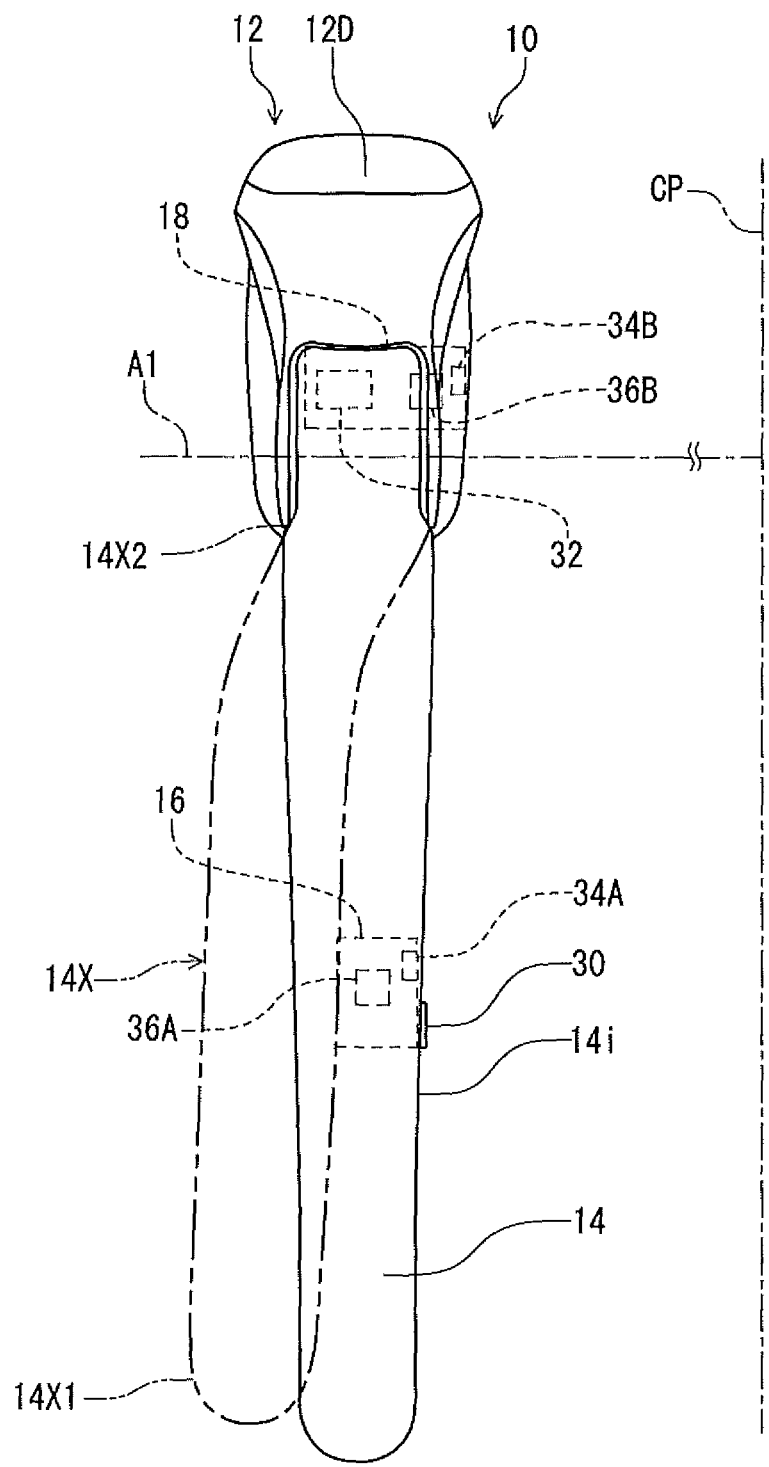
FIG. 6 is a front view of the bicycle operating device related to the schematic block diagram illustrated in FIG. 4.

As indicated with a two-dot chain line 14X in FIG. 6, the brake operating member 14 can have a curved shape such that a distal end portion 14X1 of the brake operating member 14 is offset from a proximal end portion 14X2 of the brake operating member 14. In FIG. 3, the distal end portion 14X1 is offset from the proximal end portion 14X2 toward an opposite side of a bicycle transverse center plane CP of a bicycle.

As seen in FIG. 1, the bicycle operating device 10 further comprises a cable operating structure 26 coupled to the brake operating member 14 to move the mechanical control cable C1 in response to a movement of the brake operating member 14 in the first direction D1. The mechanical control cable C1 includes an outer casing C11 and an inner wire C12 movably provided in the outer casing C11. In this embodiment, the cable operating structure 26 is provided at an end of the brake operating member 14 to receive an end of the inner wire C12 of the mechanical control cable C1.

As seen in FIGS. 1 and 3, the cable operating structure 26 is coupled to the end of the inner wire C12 of the mechanical control cable C1. Specifically, the cable operating structure 26 includes a cable attachment part 28 to couple the brake operating member 14 to the mechanical control cable C1. The cable attachment part 28 is attached to the brake operating member 14.

Figure 4:
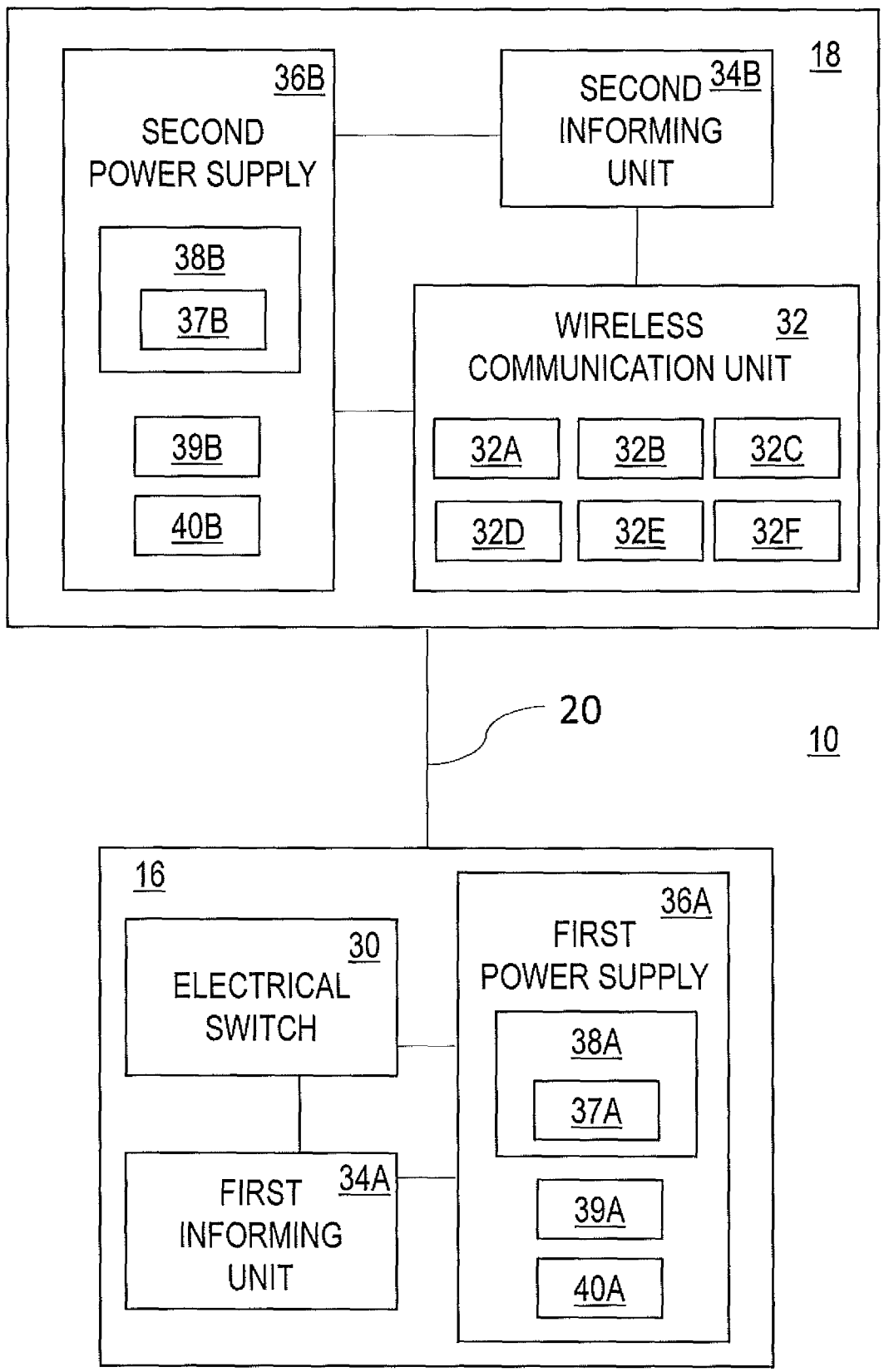
FIG. 4 is a schematic block diagram of the bicycle operating device illustrated in FIG. 1.
Figure 5:
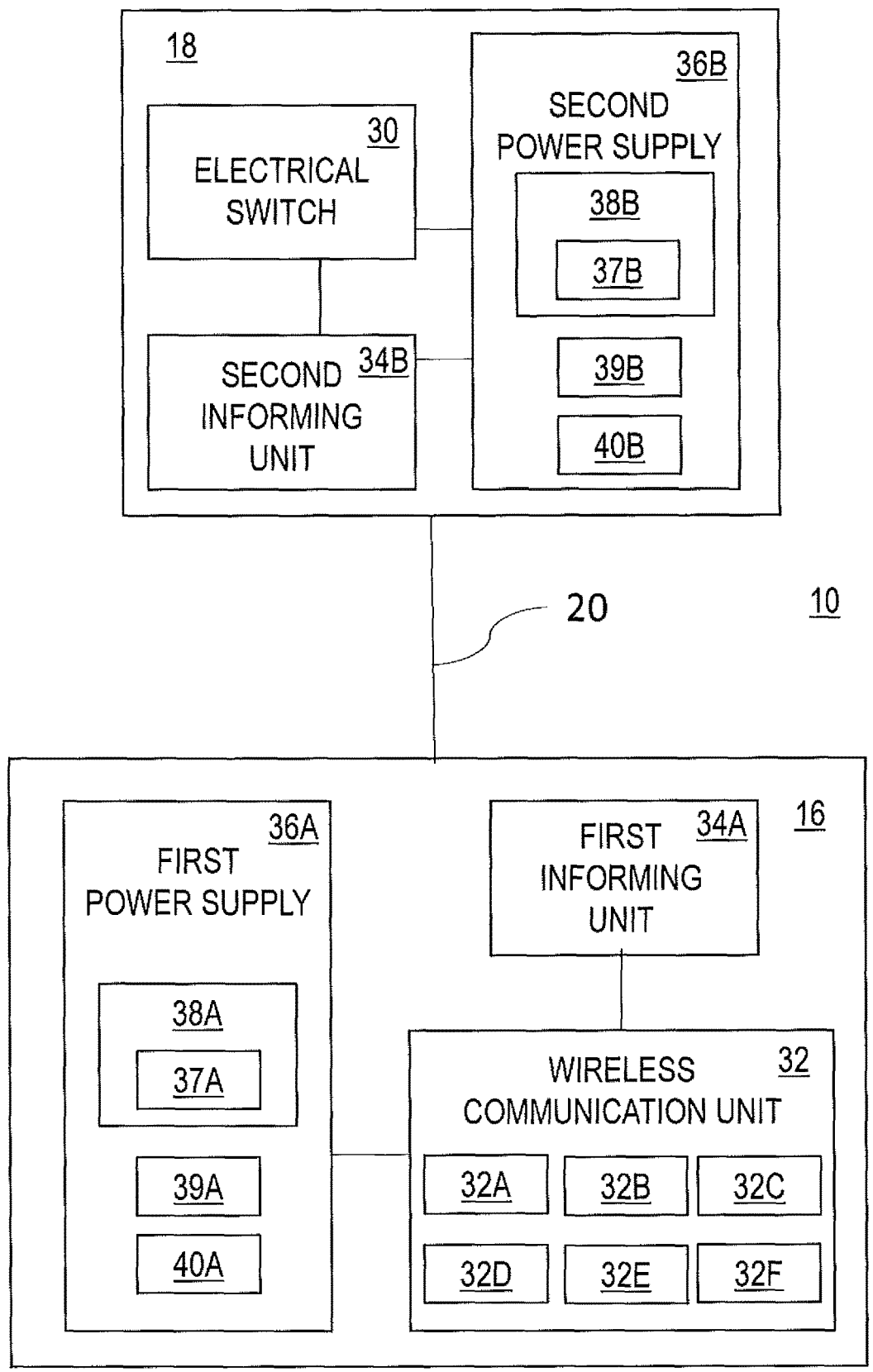
FIG. 5 is another schematic block diagram of the bicycle operating device illustrated in FIG. 1.

As seen in FIGS. 4 and 5, the first electrical unit 16 includes one of the electrical switch 30 and the wireless communication unit 32. The second electrical unit 18 includes the other of the electrical switch 30 and the wireless communication unit 32. That is, the bicycle operating device 10 comprises the electrical switch 30 and the wireless communication unit 32, the electrical switch 30 is disposed at one of the base member 12 and the brake operating member 14, and the wireless communication unit 32 is disposed at the other of the base member 12 and the brake operating member 14. FIG. 4 shows an example in which the first electrical unit 16 includes the electrical switch 30 and the second electrical unit 18 includes the wireless communication unit 32. FIG. 5 shows an example in which the first electrical unit 16 includes the wireless communication unit 32 and the second electrical unit 18 includes the electrical switch 30.

In addition, the first electrical unit 16 may further include a first informing unit 34A and a first power supply 36A. The second electrical unit 18 may further include a second informing unit 34B and a second power supply 36B. For convenience of the following description, at least one of the first informing unit 34A and the second informing unit 34B can be referred to as an informing unit 34, and at least one of the first power supply 36A and the second power supply 36B can be referred to as a power supply 36. The bicycle operating device 10 may further comprise the informing unit 34 and the power supply 36. Typically, the bicycle operating device 10 includes either of the first power supply 36A and the second power supply 36B. However, the bicycle operating device 10 may include both of the first power supply 36A and the second power supply 36B.

Figure 7:
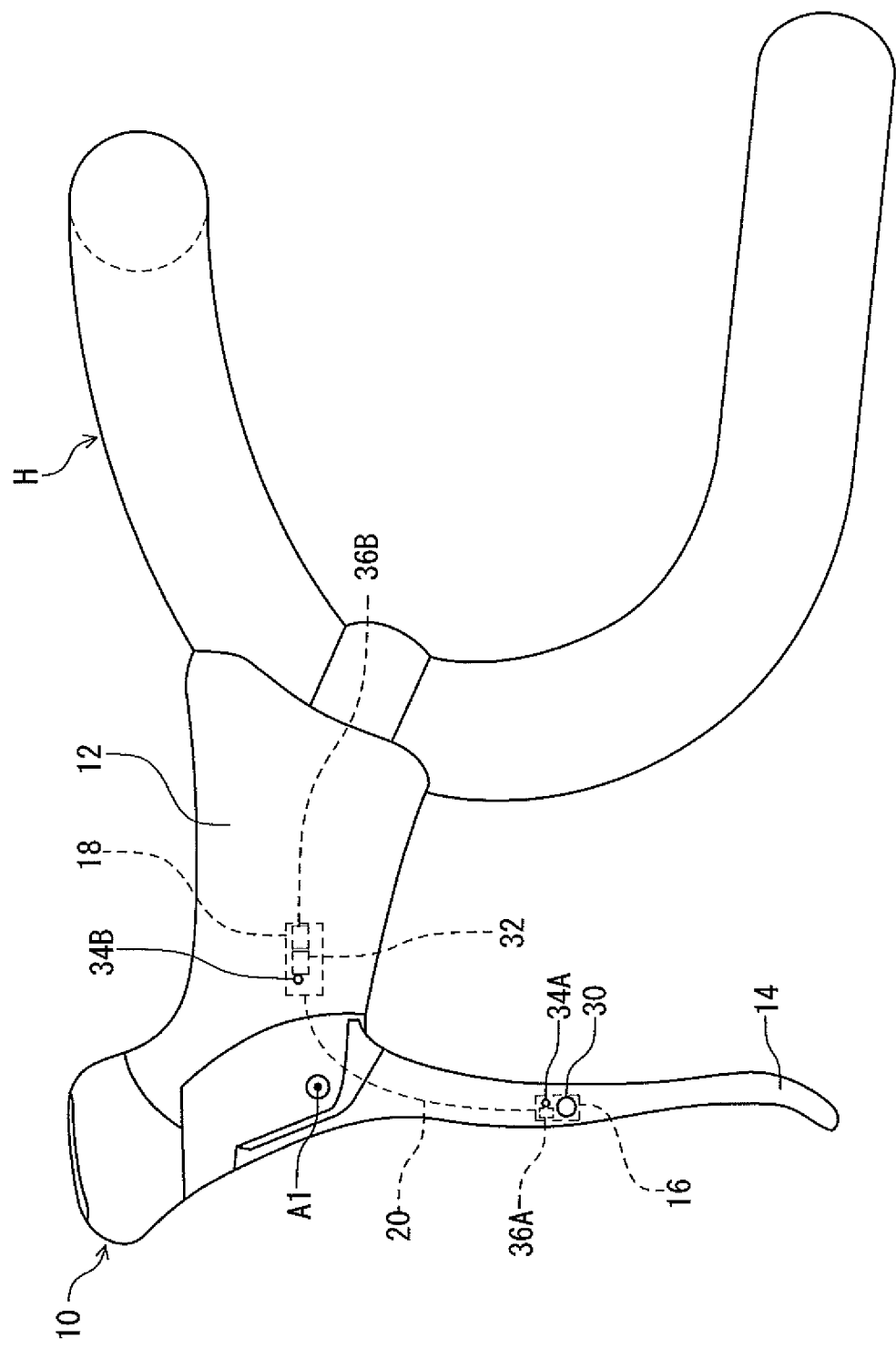
FIG. 7 is a left side elevational view of the bicycle handle provided with the bicycle operating device related to the schematic block diagram illustrated in FIG. 4.
Figure 8:
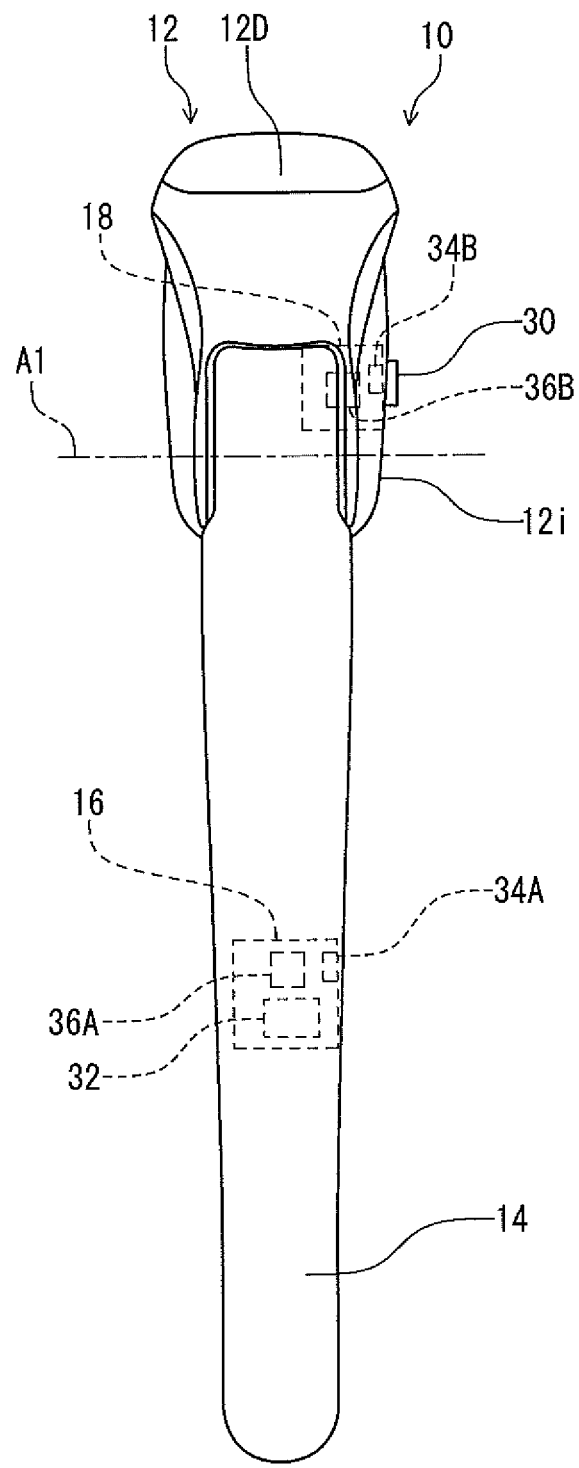
FIG. 8 is a front view of the bicycle operating device related to the schematic block diagram illustrated in FIG. 5.
Figure 9:
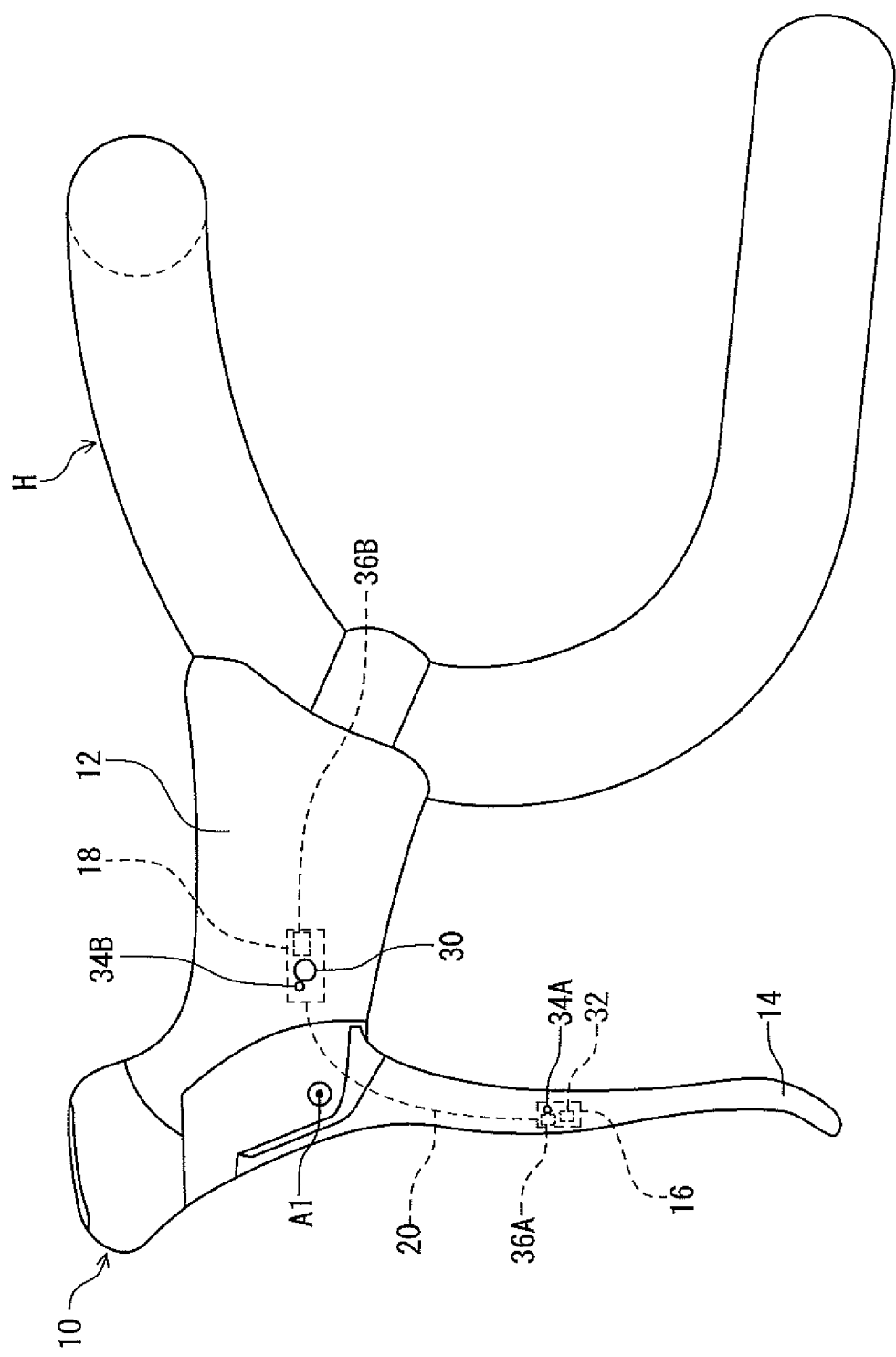
FIG. 9 is a left side elevational view of the bicycle handle provided with the bicycle operating device related to the schematic block diagram illustrated in FIG. 5.

FIGS. 6 and 7 are different views of an implementation example in which the first electrical unit 16 includes the electrical switch 30 and the second electrical unit 18 includes the wireless communication unit 32. FIGS. 8 and 9 are different views of an implementation example in which the first electrical unit 16 includes the wireless communication unit 32 and the second electrical unit 18 includes the electrical switch 30. FIGS. 7 and 9 are side views opposite to a side view of FIG. 1. In the examples shown in FIGS. 6 to 9, the electrical switch 30 includes a push switch. In the example shown in FIGS. 6 and 7, the operative part of the electrical switch 30 that will be pressed protrudes slightly from the inner surface 14i (a left side surface 14i) of the brake operating member 14. In the example shown in FIGS. 8 and 9, the operative part of the electrical switch 30 that will be pressed protrudes slightly from the inner surface 12i (a left side surface 12i) of the base member 12. The electrical switch 30 provides an electric signal for example, in response to a user's press of the electrical switch 30.

The electrical switch 30 is preferably used as a shift control switch in this embodiment, however the electrical switch 30 can be used as a switch other than the shift control switch. For example, the electrical switch 30 can be used as a suspension control switch in a case where the electrical bicycle component BC2 includes the electric suspension. The electrical switch 30 can be used as a seatpost control member in a case where the electrical bicycle component BC2 includes the electric seatpost.

As seen in FIGS. 4 and 5, the wireless communication unit 32 is connected to the electrical switch 30 to transmit a wireless signal based on the electric signal. Specifically, the wireless communication unit 32 is electrically connected to the electrical switch 30 via the electrical cable 20. The wireless communication unit 32 receives the electric signal provided by the electric switch 30 to transmit a wireless signal based on the electric signal. The bicycle operating device 10 may further comprise an antenna connected to the wireless communication unit 32, which is not shown in the drawings. Alternatively, the wireless communication unit 32 may include the antenna. The antenna may be mounted on the electronic substrate on which the wireless communication unit 32 is mounted. The wireless communication unit 32 wirelessly transmits the wireless signal based on the electric signal via the antenna.

In this embodiment, the wireless communication unit 32 includes a processor 32A, a memory 32B, a signal generating circuit 32C, a signal transmitting circuit 32D and a signal receiving circuit 34E. Thus, the wireless communication unit 32 can also be referred to as a wireless communication circuit 32 in the present application. The processor 32A includes a central processing unit (CPU) and a memory controller. The memory 32B is connected to the processor 32A. The memory 32B includes a read only memory (ROM) and a random access memory (RAM). The ROM includes a non-transitory computer-readable storage medium. The RAM includes a transitory computer-readable storage medium. The memory 32B includes storage areas each having an address in the ROM and the RAM. The processor 32A controls the memory 32B to store data in the storage areas of the memory 32B and reads data from the storage areas of the memory 32B. The memory 32B (e.g., the ROM) stores a program. The program is read into the processor 32A, and thereby functions of the wireless communication unit 32 (e.g., at least part of functions of the signal generating circuit 32C and the signal transmitting circuit 32D).

The signal generating circuit 32C generates wireless signals based on the electric signal input from the electrical switch 30. The signal generating circuit 32C superimposes digital signals on carrier wave using a predetermined wireless communication protocol to generate the wireless signals. The signal transmitting circuit 32D transmits the wireless signal via the antenna in response to the electric signal input from the electrical switch 30. In this embodiment, the signal generating circuit 32C can encrypt control information (e.g., shift information) to generate encrypted wireless signals. The signal generating circuit 32C can encrypt digital signals stored in the memory 32B using a cryptographic key. The signal transmitting circuit 32D can transmit the encrypted wireless signals. Thus, the wireless communication unit 32 wirelessly transmits the wireless signal to upshift or downshift the electric shifting device BC2 when the electrical switch 30 is turned on to provide the electric signal. However, the wireless communication unit 32 can be configured to transmit a wireless signal to control other electrical bicycle components such as the electric suspension and the electric seatpost.

Further, the signal receiving circuit 32E receives a wireless signal from the electric shifting device BC2 via the antenna. In this embodiment, the signal receiving circuit 32E decodes the wireless signal to recognize information wirelessly transmitted from the electric shifting device BC2. When the received wireless signal is encrypted using a cryptographic key, the signal receiving circuit 32E can decrypt the wireless signal using the cryptographic key. Namely, the wireless communication unit 32 can be configured to transmit a wireless signal to control other electrical bicycle components and to receive wireless signals to recognize information from the other electrical bicycle components. In other words, the wireless communication unit 32 is provided as a wireless transmitter and a wireless receiver. The other electrical bicycle components can include the electric suspension and the electric seatpost in addition to the electric shifting device BC2. In this embodiment, the wireless communication unit 32 is integrally provided as a single module or unit. However, the wireless communication unit 32 can be constituted of a wireless transmitter and a wireless receiver which are provided as separate modules or units arranged at different positions from each other. The signal receiving circuit 32E can be omitted from the wireless communication unit 32.

As seen in FIGS. 4 and 5, the informing unit 34 is connected to the wireless communication unit 32. Specifically, in FIG. 4, the second informing unit 34B is electrically connected to the wireless communication unit 32 on the same electrical substrate and the first informing unit 34A is electrically connected to the wireless communication unit 32 via the electrical cable 20. In FIG. 5, the first informing unit 34A is electrically connected to the wireless communication unit 32 on the same electrical substrate and the second informing unit 34B is electrically connected to the wireless communication unit 32 via the electrical cable 20. In the above two examples, at least one of the first informing unit 34A and the second informing unit 34B may be omitted. That is, the informing unit 34 is disposed on at least one of the base member 12 and the brake operating member 14.

Preferably, the informing unit 34 is connected to the wireless communication unit 32 to inform a user of a status of the wireless communication unit 32. However, the informing unit 34 may inform a user of a status of another bicycle component such as the electric shifting device and power supply 36. In addition, one of the first informing unit 34A and the second informing unit 34B may inform a user of a status of the wireless communication unit 32 and the other of the first informing unit 34A and the second informing unit 34B may inform a status of another bicycle component. The informing unit 34 includes a light emitting element such as a light emitting diode (LED). However, the informing unit 34 can include other elements such as a buzzer and/or an output interface to a cycle computer attached to the handlebar H via which the status is transmitted instead of or in addition to the light emitting element. Light from the informing unit 34 is visible from outside of the bicycle operating device 10 via a clear window on the inner surface 12$i$ or 14$i$.

As seen in FIGS. 4 and 5, the power supply 36 is electrically connected to at least one of the electrical switch 30 and the wireless communication unit 32. Specifically, in FIG. 4, the first power supply 36A is electrically connected to the electrical switch 30 on the same electrical substrate and to the wireless communication unit 32 via the electrical cable 20. The second power supply 36B is electrically connected to the wireless communication unit 32 on the same electrical substrate and to the electrical switch 30 via the electrical cable 20. In FIG. 5, the first power supply 36A is electrically connected to the wireless communication unit 32 on the same electrical substrate and to the electrical switch 30 via the electrical cable 20. The second power supply 36B is electrically connected to the electrical switch 30 on the same electrical substrate and to the wireless communication unit 32 via the electrical cable 20. In the above two examples, typically, the electrical cable 20 is an electric power line, thus one of first power supply 36A and the second power supply 36B is omitted. However, the bicycle operating device 10 may include both of the first power supply 36A and the second power supply 36B. In this case, the electrical cable 20 may not be the electric power line. Accordingly, the power supply 36 is disposed on at least one of the base member 12 and the brake operating member 14.

As seen in FIGS. 4 and 5, the first power supply 36A may include a first battery 37A, a first battery holder 38A, a first electric-energy generation element 39A, and a first rectifying circuit 40A. The second power supply 36B may include a second battery 37B a second battery holder 38B, a second electric-energy generation element 39B, and a second rectifying circuit 40B. The first battery 37A is mounted in the first battery holder 38A. The second battery 37B is mounted in the second battery holder 38B. For convenience of the following description, at least one of the first battery 37A and the second battery 37B can be referred to as a battery 37 corresponding to the power supply 36, and at least one of the first battery holder 38A and the second battery holder 38B can be referred to as a battery holder 38 corresponding to the power supply 36. The first electric-energy generation element 39A and the second electric-energy generation element 39B can be referred to as an electric-energy generation element 39. The first rectifying circuit 40A and the second rectifying circuit 40B can be referred to as a rectifying circuit 40. That is, the power supply 36 may include the battery 37, the battery holder 38, the electric-energy generation element 39, and rectifying circuit 40. Examples of the battery 37 include a primary battery such as a lithium manganese dioxide battery, and a secondary battery such as a lithium-ion battery. In this embodiment, the battery 37 is a primary button battery. The electric-energy generation element 39 generates the electric energy using pressure and/or vibration. In this embodiment, the electric-energy generation element 39 generates electric energy (e.g., alternating current) using pressure and/or vibration caused by a movement of the brake operating member 14 relative to the base member 12. The electric-energy generation element 39 can include a piezoelectric element. As seen in FIG. 1, the electric-energy generation element 39 can be disposed at one of the base member 12 and the brake operating member 14. When the brake operating member 14 is moved relative to the base member 12 about the first pivot axis A1 in the first direction D1, the electric-energy generation element 39 hits on a striking member 41 which is disposed at the other of base member 12 and the brake operating member 14, then the electric-energy generation element 39 is pressed and/or vibrated. The electric-energy generation element 39 converts the pressure and/or the vibration caused by the movement of the brake operating member 14 to the electric energy (e.g., alternating current). The rectifying circuit 40 is connected to the electric-energy generation element 39 to rectify the electric energy generated by the electric-energy generation element 39. Since the electric-energy generation element 39 and the rectifying circuit 40 have been well known in the electronics field, they will not be described and/or illustrated in detail here for the sake of brevity. The power source voltage is applied from the battery 37 to the wireless communication unit 32.

In this embodiment, the electrical switch 30 may include the first electric-energy generation element 56A or the second electric-energy generation element 56B to be pressed and/or vibrated when the electrical switch is pressed (turned on). Even in this case, the power supply 36 is electrically connected to at least one of the electrical switch 30 and the wireless communication unit 32, and the power supply 36 is disposed on at least one of the base member 12 and the brake operating member 14.

The wireless communication unit 32 may further include a voltage regulator 32F. The voltage regulator 32F regulates the power source voltage to a level at which various circuits of the wireless communication unit 32 and the informing unit 34 can properly operate. The voltage regulator 32F supplies the regulated voltage to the processor 32A, the memory 32B, the signal generating circuit 32C, the signal transmitting circuit 32D, and the informing unit 34. The voltage regulator 32F can be provided in the power supply 36. If the battery 37 includes only the primary battery, the voltage regulator 32F can be omitted.

The voltage regulator 32F switches the power source voltage between the battery 37 and the electric-energy generation element 39. At first, for example, the wireless communication unit 32 preferentially uses the electric energy generated by the electric-energy generation element 39 to transmit the wireless signal based on the electric signal. When the transmission of the wireless signal is completed using only the electric energy generated by the electric-energy generation element 39, the voltage regulator 32F interrupts supply of the electric energy from the battery 37 to reduce the standby power consumption of the battery 37. When the transmission of the wireless signal is not completed due to insufficient electric energy, the wireless communication unit 32 uses the electric energy supplied from the battery 37 to transmit the wireless signal based on the electric signal. The remaining electric energy generated by the electric-energy generation element 39 can be charged to a rechargeable battery (not shown) if necessary. In such an embodiment, the rechargeable battery is provided in the power supply 36 instead of or in addition to the battery 37.

The bicycle operating device 10 has the following features.

(1) The bicycle operating device 10 comprises the base member 12, the brake operating member 14, the electrical switch 30, and the wireless communication unit 32. The electrical switch 30 is disposed at one of the base member 12 and the brake operating member 14. The wireless communication unit 32 is disposed at one of the base member 12 and the brake operating member 14. Thus, the electrical switch 30 is disposed near the brake operating member 14 where a user's hand is positioned. Accordingly, it facilitates the user's operation to turn on the electrical switch 30. In addition, the wireless communication unit 32 is disposed at a different position from a position where the electrical switch 30 is disposed. This means one electrical unit (16 or 18) including the electrical switch 30 is disposed at one of the brake operating member 14 and the base member 12 and another electrical unit (18 or 16) including the wireless communication unit 32 is disposed at the other of the brake operating member 14 and the base member 12. Each of the two electrical units 16 and 18 is smaller than an electrical unit having both the electrical switch 30 and the wireless communication unit 32. Accordingly, it enables flexible designs of the brake operating member 14 and the base member 12.

In addition, when the electrical switch 30 is disposed at the base member 12 and the wireless communication unit 32 is disposed at the brake operating member 14, the bicycle operating device 10 has the following additional feature. The wireless communication unit 32 is disposed near the electrical bicycle component BC2 to which the wireless signal is transmitted. In addition, there is less interruption of a user body between the wireless communication unit 32 and the electrical bicycle component BC2 to which the wireless signal is transmitted. Accordingly, communication performance is enhanced.

(2) The bicycle operating device 10 further comprises the cable operating structure 26 coupled to the brake operating member 14 to move the mechanical control cable C1 in response to a movement of the brake operating member 14 in the first direction D1. Accordingly, it enables the braking operation by the mechanical control cable C1.

(3) The bicycle operating device 10 further comprises the informing unit 34 disposed on at least one of the base member 12 and the brake operating member 14. Accordingly, it is possible to inform a user of information related to the bicycle operating device 10.

(4) The informing unit 34 is connected to the wireless communication unit 32 to inform a user of a status of the wireless communication unit 32. Accordingly, it is possible to check the status of the wireless communication unit 32.

(5) The base member 12 includes the first end portion 12A and the second end portion 12B opposite to the first end portion 12A. The brake operating member 14 is movably coupled to the second end portion 12B. Thus, it is possible to provide a distance between the handlebar H and the brake operating member 14. Accordingly, it is possible to prevent interference between the handlebar H and the brake operating member 14.

(6) The first end portion 12A includes the mounting surface 12E having the curved shape corresponding to the drop-down handlebar H. Accordingly, it is possible to firmly fix the bicycle operating device 10 to the drop-down handlebar H.

(7) The base member 12 includes the grip portion 12C arranged between the first end portion 12A and the second end portion 12B. The grip portion 12C allows the user to easily operate the brake operating member 14.

(8) The second end portion 12B includes the pommel portion 12D. The pommel portion 12D allows the user to lean on the base member 12 during riding a bicycle.

(9) The power supply 36 is electrically connected to at least one of the electrical switch 30 and the wireless communication unit 32. Accordingly, it is possible to supply electric power to the at least one of the electrical switch 30 and the wireless communication unit 32.

(10) The power supply 36 is disposed on at least one of the base member 12 and the brake operating member 14. Accordingly, it is possible to embed the electric energy supply unit in one electrical unit (16 or 18) including the electrical switch 30 or another electrical unit (18 or 16) including the wireless communication unit 32. Therefore, an electrical wiring can be simplified.

Second Embodiment

A bicycle operating device 210 in accordance with a second embodiment will be described below referring to FIG. 10. The bicycle operating device 210 has the same structure and/or configuration as those of the bicycle operating device 10 except for the arrangement of some elements. Thus, elements having substantially the same function as those in the above embodiment will be numbered the same here, and will not be described and/or illustrated again in detail here for the sake of brevity.

Figure 10:
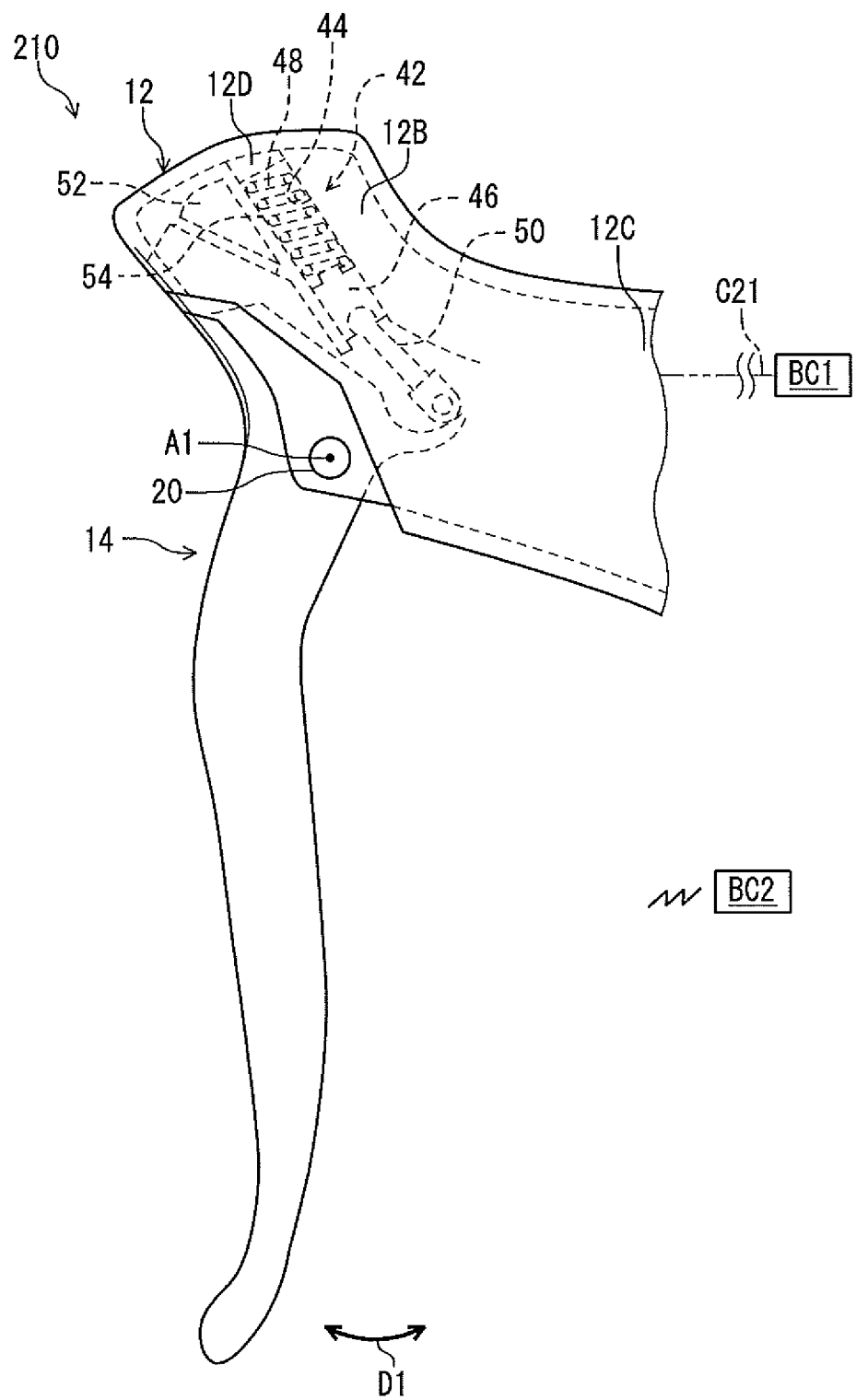
FIG. 10 is a partial left side elevational view of a bicycle operating device in accordance with a second embodiment.

As seen in FIG. 10, the bicycle operating device 210 comprises the base member 12, the brake operating member 14, the electrical switch 30, the wireless communication unit 32, the informing unit 34, and the power supply 36. Similarly to the bicycle operating device 10 of the first embodiment, the electrical switch 30 is disposed at one of the base member 12 and the brake operating member 14. Each of the wireless communication unit 32, the informing unit 34, and the power supply 36 is disposed on at least one of the base member 12 and the brake operating member 14.

Unlike the bicycle operating device 10 of the first embodiment, however, the bicycle operating device 210 further comprise a hydraulic unit 42 instead of the cable operating structure 26. The hydraulic unit 42 is coupled to the brake operating member 14 to generate a hydraulic pressure in response to a movement of the brake operating member 14 relative to the base member 12 in the first direction D1. Specifically, the hydraulic unit 42 includes a hydraulic cylinder 44, a piston 46, a return spring 48, a piston rod 50, and a hydraulic reservoir 52. The piston 46 is movably disposed in the hydraulic cylinder 44. The hydraulic cylinder 44 and the piston 46 define a hydraulic chamber 54. The return spring 48 is provided in the hydraulic chamber 54 to bias the piston 46 toward an initial position. The brake operating member 14 is coupled to the piston 46 via the piston rod 50. The hydraulic reservoir 52 is connected to the hydraulic chamber 54. The hydraulic chamber 54 is connected to the bicycle brake BC1 via a hydraulic hose C21. In this embodiment, the bicycle brake BC1 includes a hydraulic brake.

With the bicycle operating device 210, it is possible to obtain substantially the same effects as those of the bicycle operating device 10 of the first embodiment.

Furthermore, the bicycle operating device 210 further comprises the hydraulic unit 42 coupled to the brake operating member 14 to generate a hydraulic pressure in response to the movement of the brake operating member 14 in the first direction D1. Accordingly, it is possible to respectively perform the braking operation and the different operation via the hydraulic fluid and the wireless communication.

Third Embodiment

A bicycle operating device 310 in accordance with a third embodiment will be described below referring to FIGS. 11 and 12. The bicycle operating device 310 has the same structure and/or configuration as those of the bicycle operating device 210 except for the base member 12. Thus, elements having substantially the same function as those in the above embodiment will be numbered the same here, and will not be described and/or illustrated again in detail here for the sake of brevity.

Figure 11:
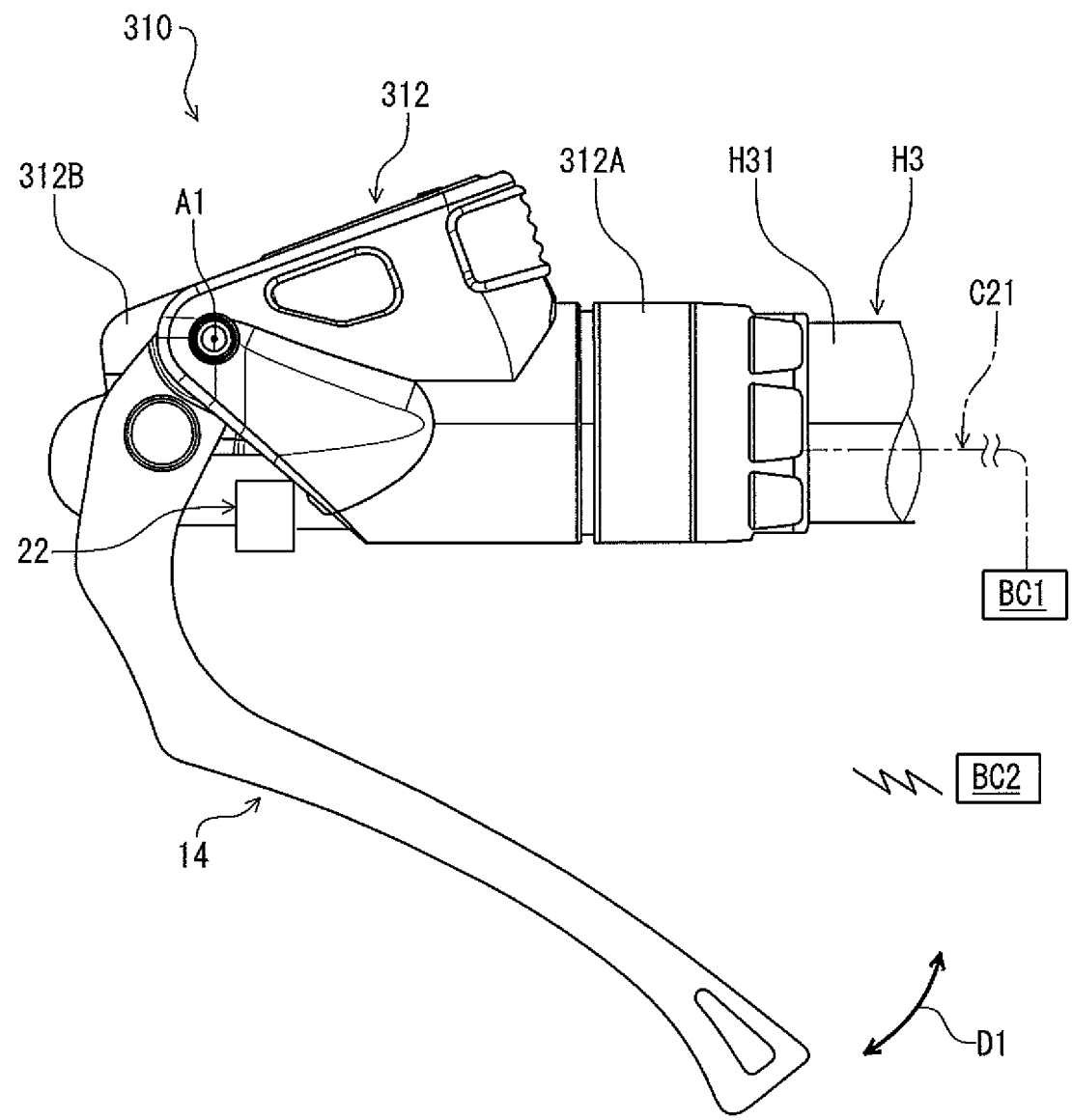
FIG. 11 is a partial left side elevational view of a bicycle operating device in accordance with a third embodiment.

As seen in FIG. 11, the bicycle operating device 310 comprises a base member 312, the brake operating member 14, the electrical switch 30, the wireless communication unit 32, the informing unit 34, and the power supply 36. The base member 312 has substantially the same structure as that of the base member 12 of the first or second embodiment. However, the bicycle operating device 310 is configured to be mounted to a bull horn handlebar H3 provided as the handlebar H. The bull horn handlebar H3 can also be referred to as the handlebar H3.

The base member 312 includes a first end portion 312A and a second end portion 312B. The first end portion 312A is configured to be coupled to the handlebar H3 in a mounting state where the bicycle operating device 310 is mounted to the handlebar H3. The second end portion 312B is opposite to the first end portion 312A. The brake operating member 14 is movably coupled to the second end portion 312B. However, the first end portion 312A is configured to be coupled to a bar end H31 of the handlebar H3 in the mounting state.

Figure 12:
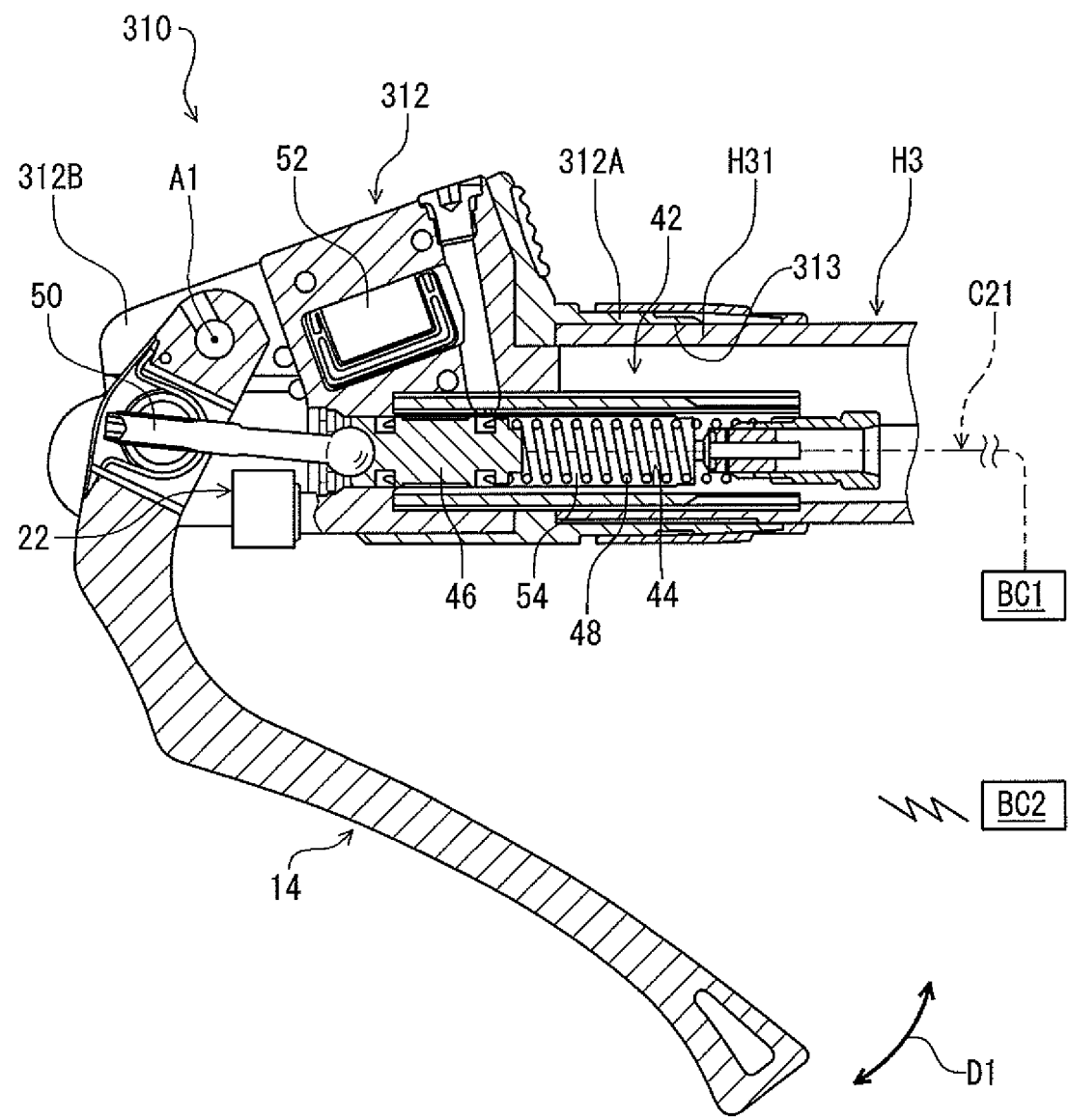
FIG. 12 is a cross-sectional view of the bicycle operating device illustrated in FIG. 11.

As seen in FIG. 12, the base member 312 includes a mounting hole 313 disposed at the first end portion 312A. The bar end H31 of the handlebar H3 is disposed in the mounting hole 313. The hydraulic unit 42 is at least partly disposed in the bar end H31 of the handlebar H3. The cable operating structure 26 of the bicycle operating device 10 can be applied to the bicycle operating device 310 instead of the hydraulic unit 42.

With the bicycle operating device 310, it is possible to obtain substantially the same effects as those of the bicycle operating device 210 of the second embodiment.

Furthermore, the first end portion 312A is configured to be coupled to the bar end H31 of the handlebar H3 in the mounting state. Accordingly, it is possible to utilize the bicycle operating device 310 as a bar-end operating device.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member including a pommel portion, the base member includes a first end portion configured to be coupled to a handlebar in a mounting state where the bicycle operating device is mounted to the handlebar;
   a brake operating member pivotably coupled to the base member about a first pivot axis;
   an electrical switch to provide an electric signal;
   a wireless communication unit including an antenna, the wireless communication unit being connected to the electrical switch to transmit a wireless signal based on the electric signal, the wireless communication unit being disposed on the base member, a first distance from the wireless communication unit to the pommel portion is greater than a second distance from the wireless communication unit to the first pivot axis;
   an informing unit disposed on the base member; and
   a power supply electrically connected to at least one of the electrical switch and the wireless communication unit, at least part of the power supply is disposed closer to the first end portion than the first pivot axis when viewed from a direction parallel to the first pivot axis, wherein
   the wireless communication unit including the antenna, the power supply, and the informing unit are provided as an electrical unit disposed on the base member between the first pivot axis and the first end portion of the base member when viewed from the direction parallel to the first pivot axis, and
   the power supply and the informing unit are both provided on a same electrical substrate provided on the base member.

2. The bicycle operating device according to claim 1, further comprising:
   a cable operating structure coupled to the brake operating member to move a mechanical control cable in response to a movement of the brake operating member relative to the base member.

3. The bicycle operating device according to claim 2, wherein
   the electrical switch is provided on the brake operating member, and
   the power supply is electrically connected to both the electrical switch and the wireless communication unit.

4. The bicycle operating device according to claim 3, wherein
   the cable operating structure is provided in the base member such that the mechanical control cable extends through the base member at a height above the electrical unit when in the mounting state.

5. The bicycle operating device according to claim 4, wherein
   the informing unit includes a light emitting element, and
   a window is provided on the base member so that light emitted from the light emitting element is visible from outside of the bicycle operating device via the window on the base member.

6. The bicycle operating device according to claim 5, wherein
   the power supply at least partially overlaps with the wireless communication unit when viewed in the direction parallel to the first pivot axis.

7. The bicycle operating device according to claim 1, wherein
   the base member includes
   a second end portion opposite to the first end portion, and
   the brake operating member is movably coupled to the second end portion.

8. The bicycle operating device according to claim 7, wherein
   the first end portion includes a mounting surface having a curved shape corresponding to face a drop-down handlebar.

9. The bicycle operating device according to claim 7, wherein
   the base member includes a grip portion arranged between the first end portion and the second end portion.

10. The bicycle operating device according to claim 7, wherein
    the second end portion includes the pommel portion.

11. The bicycle operating device according to claim 1, wherein
    the informing unit includes a light emitting element, and
    a window is provided on the base member so that light emitted from the light emitting element is visible from outside of the bicycle operating device via the window.

12. The bicycle operating device according to claim 1, wherein
the informing unit includes a buzzer.

13. The bicycle operating device according to claim 1, further comprising an additional informing unit disposed on the brake operating member, the additional informing unit including at least one of an additional light emitting element or an additional buzzer.

14. The bicycle operating device according to claim 13, wherein
the additional informing unit is connected to the wireless communication unit to inform a user of a status of an electric shifting device or a power supply of the bicycle operating device.

15. The bicycle operating device according to claim 1, wherein
the power supply at least partially overlaps with the wireless communication unit when viewed in the direction parallel to the first pivot axis.

16. The bicycle operating device according to claim 1, wherein
the informing unit includes at least one of a light emitting element or a buzzer, the informing unit being connected to the wireless communication unit to inform a user of a status of the wireless communication unit.

17. A bicycle operating device comprising:
a base member including a pommel portion, the base member includes a first end portion configured to be coupled to a handlebar in a mounting state where the bicycle operating device is mounted to the handlebar;
a brake operating member pivotably coupled to the base member about a first pivot axis;
an electrical switch to provide an electric signal;
a wireless communication unit including an antenna, the wireless communication unit being connected to the electrical switch to transmit a wireless signal based on the electric signal, the wireless communication unit being disposed on the base member, a first distance from the wireless communication unit to the pommel portion is greater than a second distance from the wireless communication unit to the first pivot axis;
an informing unit disposed on the base member, the informing unit including at least one of a light emitting element or a buzzer; and
a power supply electrically connected to at least one of the electrical switch and the wireless communication unit, at least part of the power supply is disposed closer to the first end portion than the first pivot axis when viewed from a direction parallel to the first pivot axis, wherein
the informing unit is electrically connected to the wireless communication unit on a same electrical substrate, and
the wireless communication unit including the antenna, the power supply, and the informing unit are provided as an electrical unit disposed on the base member between the first pivot axis and the first end portion of the base member when viewed from the direction parallel to the first pivot axis.

* * * * *